(12) United States Patent
Wardle et al.

(10) Patent No.: US 8,371,808 B2
(45) Date of Patent: Feb. 12, 2013

(54) MULTI-VANE SEGMENT DESIGN AND CASTING METHOD

(75) Inventors: Brian Kenneth Wardle, Brugg-Lauffohr (CH); Thomas Peter Sommer, Basel (CH); Beat Von Arx, Trimbach (CH); Andre Saxer, Mellingen (CH)

(73) Assignee: Alstom Technology Ltd, Baden (CH)

( * ) Notice: Subject to any disclaimer, the term of this patent is extended or adjusted under 35 U.S.C. 154(b) by 730 days.

(21) Appl. No.: 12/617,310

(22) Filed: Nov. 12, 2009

(65) Prior Publication Data

US 2010/0124493 A1 May 20, 2010

(30) Foreign Application Priority Data

Nov. 14, 2008 (EP) ..................................... 08169108

(51) Int. Cl.
*F01D 9/02* (2006.01)
(52) U.S. Cl. ....................................................... 415/185
(58) Field of Classification Search ............... 415/210.1, 415/185, 189
See application file for complete search history.

(56) References Cited

U.S. PATENT DOCUMENTS

| | | | |
|---|---|---|---|
| 4,043,385 A | 8/1977 | Petrenchik | |
| 4,641,702 A | 2/1987 | Petrenchik | |
| 6,206,637 B1 | 3/2001 | Aoki et al. | |
| 6,435,813 B1 | 8/2002 | Rieck, Jr. et al. | |
| 7,377,743 B2 | 5/2008 | Flodman et al. | |
| 2003/0206799 A1 | 11/2003 | Scott | |
| 2004/0067131 A1 | 4/2004 | Joslin | |
| 2005/0089393 A1 | 4/2005 | Zatorski et al. | |
| 2007/0122266 A1 | 5/2007 | Cairo et al. | |
| 2007/0292270 A1 | 12/2007 | Suciu et al. | |

FOREIGN PATENT DOCUMENTS

| | | |
|---|---|---|
| EP | 1 408 199 A1 | 4/2004 |
| EP | 1 526 251 A1 | 4/2005 |
| GB | 2 388 161 A | 11/2003 |
| JP | 60209604 A * | 10/1985 |
| JP | 11-223199 A | 8/1999 |
| WO | WO 2006/060012 A1 | 6/2006 |

OTHER PUBLICATIONS

European Search Report dated Mar. 13, 2009.

* cited by examiner

*Primary Examiner* — Richard Edgar
(74) *Attorney, Agent, or Firm* — Buchanan Ingersoll & Rooney PC

(57) ABSTRACT

Provided is an industrial gas turbine multi vane segment, which can be cast in one piece using a wax pattern method. The multi vane segment includes a platform; at least three airfoils, extending radially from the platform, having a combined airfoil volume, a chord length and an airfoil thickness; and a shroud with a shroud volume, disposed on an end of said airfoils radially distant from the platform. The ratio of the shroud volume to the combined airfoil volume defines a first ratio, while the multi vane segment has a first ratio greater or equal to 1.4:1. This ratio enables preferential solidification, during casting, of the airfoils before the shroud.

14 Claims, 3 Drawing Sheets

MULTI-VANE SEGMENT DESIGN AND CASTING METHOD

TECHNICAL FIELD

The disclosure relates to the casting of industrial gas turbine multi vane segments comprising multiple airfoils and a shroud.

In this specification:

a shroud of a multi vane segment is taken to mean the distal end, when fitted, of the multi vane segment relative to the longitudinal axis of the industrial gas turbine; and a multi vane segment is defined to comprise one singularly formed shroud and a plurality of airfoils extending in the same direction from the shroud.

BACKGROUND INFORMATION

Gas turbines comprise series of circumferentially distributed vanes connected to a cast stator by a shroud with fixation features for fixing the vane to the stator. Each shroud of a vane is suitably sealed against the shroud of adjacent vanes. Sealing adds significant complexity to the assembly and must be considered in vane design in order to optimize the overall efficiency of the gas turbine. It may therefore be preferable to reduce seal length. This can be achieved by, for example, designing the vane with a reduced chord length so by downsizing the shroud resulting in less sealing area and shorter seal length. Changing the vane dimension for reasons other than to improve its aerodynamic performance however, can lead to an overall loss in the vane's efficiency.

As an alternative, vanes may be manufactured as multi vane segments such that each segment comprises a common platform and shroud between which two or more airfoils are formed. In this way, the overall seal length per vane is reduced for a given design enabling the design Engineer more freedom to consider the aerodynamic performance of the vane.

Examples of multi vane segments are disclosed in US 2007/0122266 A1, which teaches of a multi vanes arrangement where airfoils are individually sealed onto a common platform. U.S. Pat. No. 6,435,813 and U.S. Pat. No. 7,377,743 teach of other multi vane arrangements in which the segments may be cast in one piece.

As castings become larger and more complex, by for example taking the form of multi vane segment castings, shrinkage problems increase and it becomes harder to control the casting process parameters. This known problem leads to higher rejections rates. As a result, complex multi vane segment designs, which can economically be cast for small aero engine multi vanes, may have unacceptably high rejection rates when cast as larger industrial gas turbine multi vane segments.

SUMMARY OF THE INVENTION

Provided is a multi vane segment for larger industrial gas turbine and a method of casting thereof that provides reduced casting defects when cast by the wax pattern method.

This problem is solved by means of the subject matters of the independent claims. Advantageous embodiments are given in the dependant claims.

The invention is based on the general idea of casting a multi vane segment with a prescribed shroud volume to airfoil volume ratio that encourages the preferential solidification of the airfoil over the shroud after pouring so by minimizing internal stresses in the casting formed during solidification without the need for complex temperature cool down controls.

An aspect provides an industrial gas turbine multi vane segment that can be cast in one piece using the wax pattern method and comprises: a platform; at least three airfoils extending radially from the platform having a combined airfoil volume, a chord length and a airfoil thickness; and a shroud, disposed on an end of the airfoils radially distant from the platform, having a shroud volume, wherein the ratio of the shroud volume to the combined airfoil volume defines a first ratio. The segment is characterized by having a first ratio that is greater or equal to 1.4:1. In another aspect the first ratio is further limited to less than 2:1. These ratio limits were found to promote airfoil solidification resulting in improved casting quality for a three-airfoil multi vane segment having a casting weight of 65 kg. However it is reasonable to expect that ratios are applicable for other wax pattern multi vane segment castings weighing 55 kg or more.

The casting of the industrial gas turbine multi vane segments to the defined first ratio, enables, in another aspect, the casting of the multi vane segment to a further second ratio greater than or equal to 7:1, where the second ratio is defined as the ratio of the airfoil chord length to airfoil thickness. In this way an aerodynamically efficient design is provided that is made economically castable by the reduced shroud seal length.

A further aspect provides a process for casting an industrial gas turbine multi vane segment weighing more than 55 kg that is suitable for casting as one piece and comprises: a platform; at least three airfoils extending radially from the platform having a combined airfoil volume, a chord length and an airfoil thickness; and a shroud, disposed on a radially distal end of the airfoil relative to the longitudinal axis of the turbine, having a shroud volume. The multi vane segment further has a first ratio defined by the ratio of the shroud volume to combined airfoil volume, and a second ratio defined by the ratio of chord length to airfoil thickness. The process characterized by casting, by means of the wax pattern method the multi vane segment with a first ratio of greater or equal to 1.4:1 and a second ratio of greater than or equal to 7:1.

Other advantages of the present invention will become apparent from the following description, taken in connection with the accompanying drawings wherein by way of illustration and example, an exemplary embodiment of the invention is disclosed.

BRIEF DESCRIPTION OF THE DRAWINGS

By way of example, an embodiment of the invention is described more fully hereinafter with reference to the accompanying drawings, in which.

DETAILED DESCRIPTION OF THE INVENTION

Figure 1:
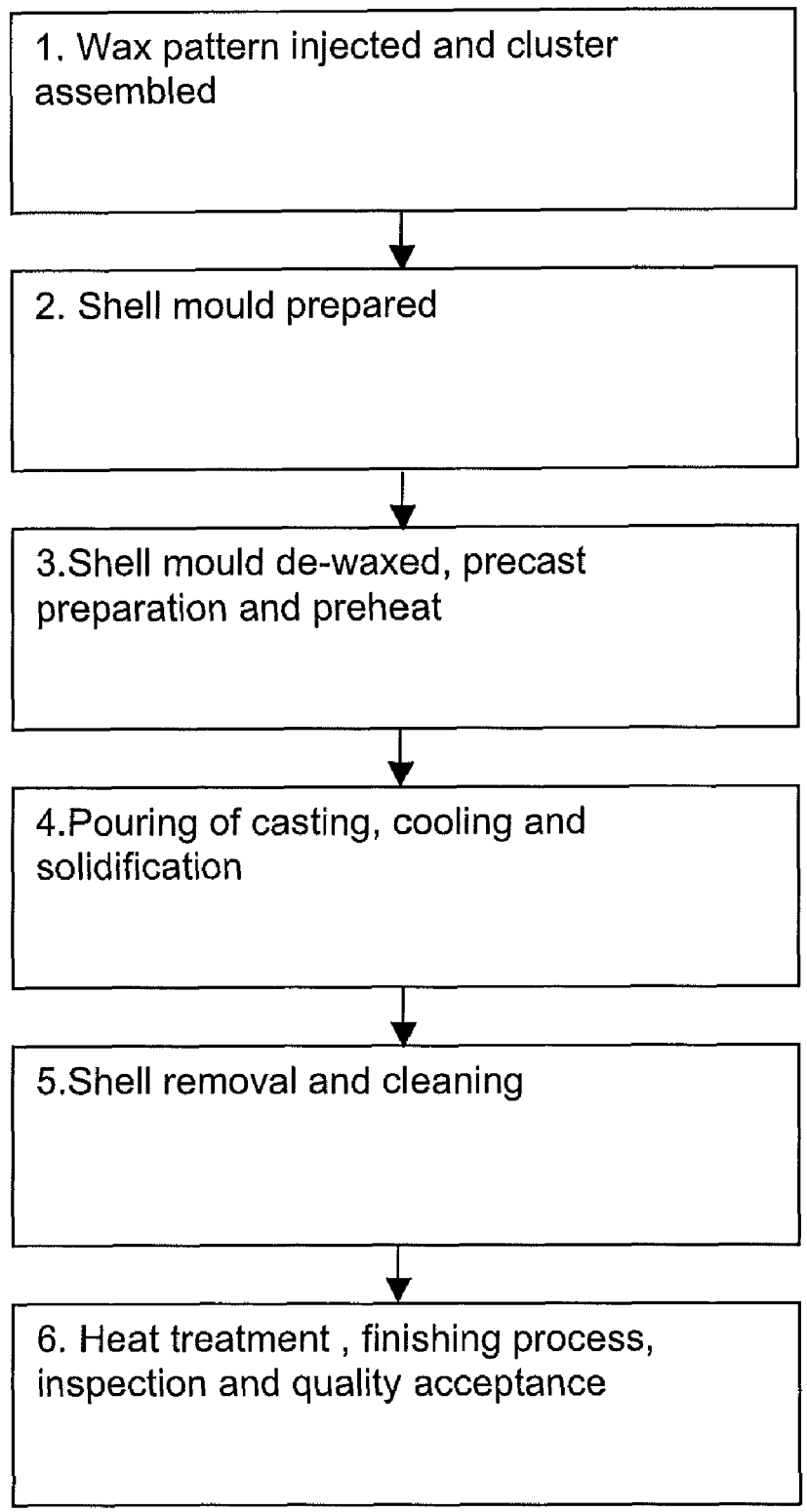
FIG. 1 is a flowchart of the wax pattern casting method.

Preferred embodiments of the present invention are now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details.

FIG. 1 shows the steps of an exemplary wax pattern or investment casting method. First, a wax pattern of the multi vane segment 1 is formed by injecting plastic, ceramic or wax and the cluster assembled. Next, a shell mould is prepared from the wax pattern. The shell mould is then de-waxed, by for example heating in a pressurized steam autoclave, after which the shell mould undergoes precast preparation and preheat. The casting is then poured and allowed to cool and solidify. After solidification the shell is removed and the casting cleaned. Finally heat treatment and other finishing processes, followed by inspection and quality acceptance, complete the process.

Figure 2:
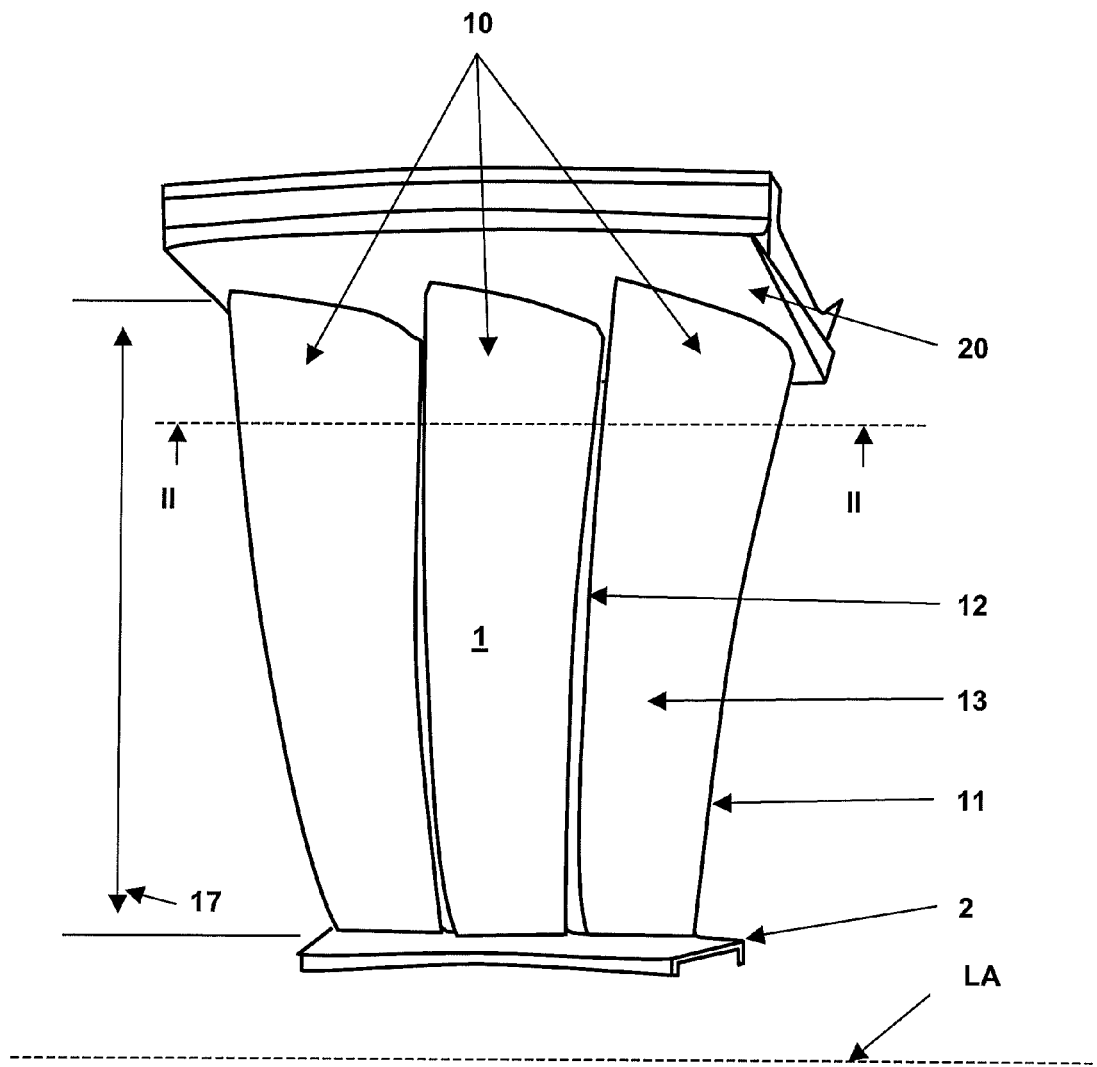
FIG. 2 is a perspective view of an industrial gas turbine multi vane segment produced by the method of FIG. 1 with the dimensions of the invention.

FIG. 2 shows an industrial gas turbine multi vane segment 1 cast by means of a wax pattern method of FIG. 1. The multi vane segment 1 comprises a platform 2 having at least three airfoils 10 extending radially from the platform 2 and a shroud 20 disposed on the radially opposite end of the airfoils 10 relative to the platform 2 which when fitted in a turbine is also the distal end of the multi vane segment 1 relative to the longitudinal axis LA of the turbine. While the exemplary embodiment shows only three airfoils 10 the multi vane segment 1 could comprise four or more airfoils 10 wherein the number of airfoils 10 is limited, in part, by the foundry's production, technical and plant capability.

Through the selection of the volume ratio, defined by the volume of the shroud 20 to the combined airfoil volume i.e. the combined volume displaced by all three airfoils 10 of the multi vane segment 1, solidification of airfoils 10 before the solidification of the shroud 20 after pouring is promoted. By this means, it is possible to reduce casting defects and/or minimise internal stresses in the casting by enabling the drawing of liquid metal from the shroud into airfoils 10 portions of the casting shell as the airfoils 10 shrink during solidification. This is particularly advantageous for larger multi vane segments 1 of the industrial gas turbine type as it is more difficult to control the solidification temperature of individual parts of larger, more complex castings. These measures therefore provide lower casting rejection rates than if the multi vane segments were designed predominantly based on aerodynamic factors alone.

It has been found that the preferred volume ratio range is dependant on a number of factors that include the number of airfoils 10 in the multi vane segment 1 and the total size or weight of the casting. Where the multi vane segment 1 has at least three airfoils 10 and has a weight over 65 kilograms or at least over 55 kilograms a volume ratio of preferably greater than or equal to 1.4:1 favourably ensures solidification of the airfoils 10 before solidification of the shroud 20. Increasing shroud weight increases operating stress on the airfoils 10 and therefore to balance operational stress and casting performance it is preferably to limit the volume ratio to less than 2:1.

When multi vane segment 1 complexity is reduced, by for example reducing the number of airfoils 10 in the multi vane segment 1 or alternatively reducing casting weight, a wider range of volume ratios may still provide adequate casting quality due to the reduced effect of shrinkage.

Figure 3:
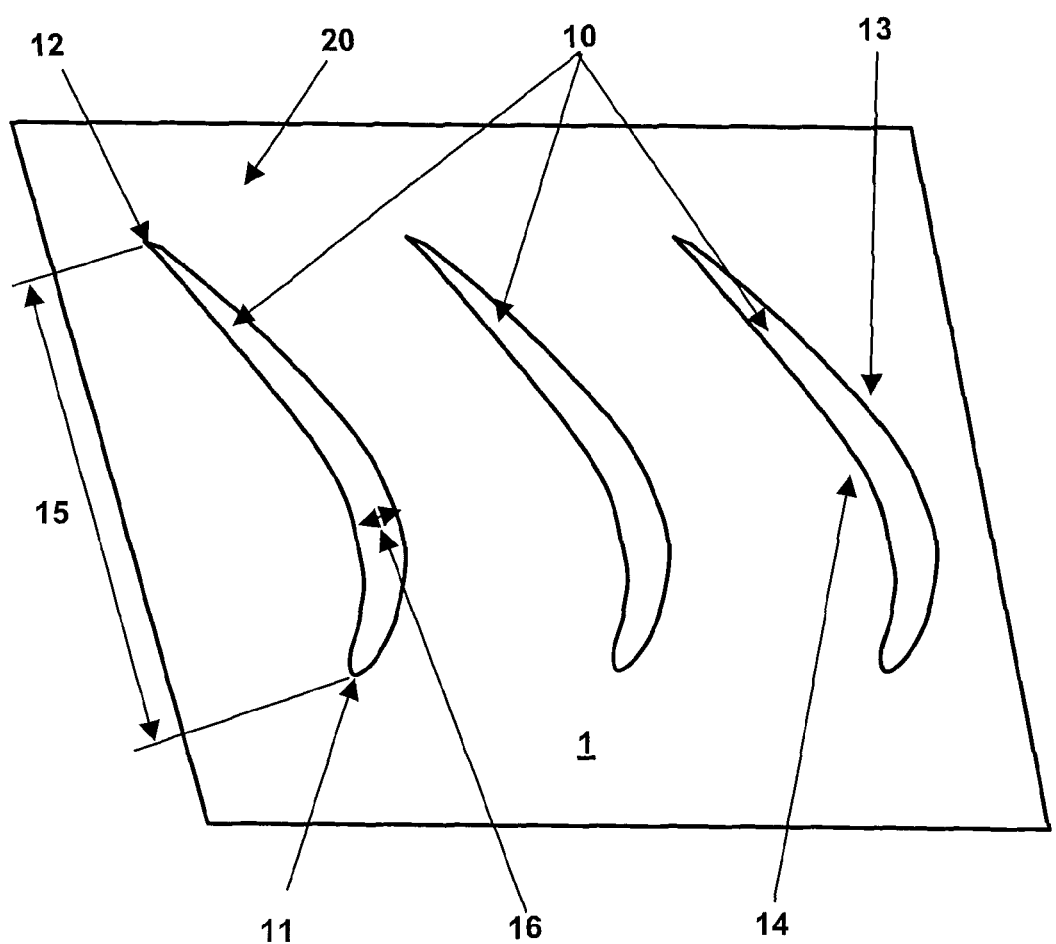
FIG. 3 is a sectional view through II-II in FIG. 2 of the industrial gas turbine multi vane segment.

FIG. 3 shows a sectional view of an exemplary multi vane segment 1 showing chord length 15 and the airfoil thickness 16

The chord length 15 is the length equal to the linear distance between the leading edge 11 and the trailing edge 12. The chord length 15 of a 3D airfoil may vary along the radial height of the airfoils 10. To account for this, in this specification, the chord length 15 is to be taken to mean the numerical average chord length 15 along the radial height 17 of the airfoils 10

Likewise the airfoil thickness 16, defined at a given radial height 17 is the maximum perpendicular length (thickness) between the pressure side 14 and the suction side 13 of the airfoils 10 As airfoil thickness 16 can vary along the radial height 17 of the airfoils 10, to provide consistent meaning to the term throughout this specification, the airfoil thickness 16 is to be taken to mean the numerical average airfoil thickness 16 along the radial height 17 of the multi vane segment's 1 airfoils 10.

The aerodynamic characteristics of airfoils 10 may be improved by increasing the chord length 15 while reducing airfoil thickness 16, however an increased chord length 15 requires a larger shroud 20 which in turn requires increased sealing length. Further, the rigidity of the airfoils 10 is reduced as airfoil thickness 16 is reduced. By casting a multi vane segment 1 with at least three airfoils 10 the overall seal length is reduced and so an economical increase in the platform size can be achieved, which in turn provides the opportunity to increase the chord length 15.

If the vane segment is further configured as a multi vane segment 1 having a common shroud 20 disposed on the radially distal end of the airfoils 10 the effective rigidity of the airfoils 10 is increased enabling thinner airfoil 10 design.

By casting an industrial gas turbine vane as a multi vane segment 1, with the specified volume ratio of the exemplary embodiments of the invention it is possible to economically cast a multi vane segment 1, weighing over 55 kg, or at least over 65 kg, with an chord length 15 to airfoil thickness 16 length ratio of greater than or equal to 7:1 so by providing a multi vane segment 1 with improved aerodynamic characteristics.

Although the invention has been herein shown and described in what is conceived to be the most practical and preferred embodiment, it is recognized that departures can be made within the scope of the invention, which is not to be limited to details described herein but is to be accorded the full scope of the appended claims so as to embrace any and all equivalent devices and apparatus.

REFERENCE NUMBERS 1 multi vane segment
2 platform
10 airfoils
11 leading edge
12 trailing edge
13 suction side
14 pressure side
15 chord length
16 airfoil thickness
17 radial height
20 shroud
LA Longitudinal axis

The invention claimed is:
1. An industrial gas turbine multi vane segment, which can be cast in one piece using a wax pattern method, comprising:
 a platform;
 at least three airfoils extending radially from said platform having a combined airfoil volume, a chord length and an airfoil thickness; and
 a shroud, disposed on an end of said airfoils radially distant from said platform, having a shroud volume, wherein a ratio of the shroud volume to the combined airfoil volume defines a first ratio greater than or equal to 1.4:1.

2. The multi vane segment of claim 1, wherein said first ratio is less than 2:1.

3. The multi vane segment of claim 2, wherein a second ratio, defined as the ratio of the airfoils chord length to airfoil thickness, is greater than or equal to 7:1.

4. The multi vane segment of claim 3, wherein the multi vane segment weighs more than 55 kg.

5. The multi vane segment of claim 3, wherein the multi vane segment weighs more than 65 kg.

6. The multi vane segment of claim 5, wherein the multi vane segment comprises no more than three airfoils.

7. The multi vane segment of claim 1, wherein a second ratio, defined as a ratio of the airfoils chord length to airfoil thickness, is greater than or equal to 7:1.

8. The multi vane segment of claim 7, wherein the multi vane segment weighs more than 55 kg.

9. The multi vane segment of claim 7, wherein the multi vane segment weighs more than 65 kg.

10. The multi vane segment of claim 7, wherein the multi vane segment comprises no more than three airfoils.

11. The multi vane segment of claim 1, wherein the multi vane segment weighs more than 55 kg.

12. The multi vane segment of claim 1, wherein the multi vane segment weighs more than 65 kg.

13. The multi vane segment of claim 1, wherein the multi vane segment comprises no more than three airfoils.

14. A process for casting an industrial gas turbine multi vane segment weighing more than 55 kg suitable for casting as one piece and having:
- a platform;
- at least three airfoils extending radially from said platform having a combined airfoil volume, a chord length and a airfoil thickness; and
- a shroud, disposed on an end of said airfoils radially distant from said platform, having a shroud volume, the process comprising:
- selecting the multi vane segment with a first ratio defined by a ratio of the shroud volume to combined airfoil volume, and a second ratio defined by a ratio of chord length to airfoil thickness; and
- casting, by a wax pattern method, said multi vane segment with a first ratio of greater than or equal to 1.4:1 and a second ratio of greater than or equal to 7:1.

* * * * *